Sept. 20, 1966　　　　M. L. BENZER　　　　3,273,326
SPARK ARRESTOR FOR DIESEL LOCOMOTIVE ENGINES
Filed Oct. 26, 1964
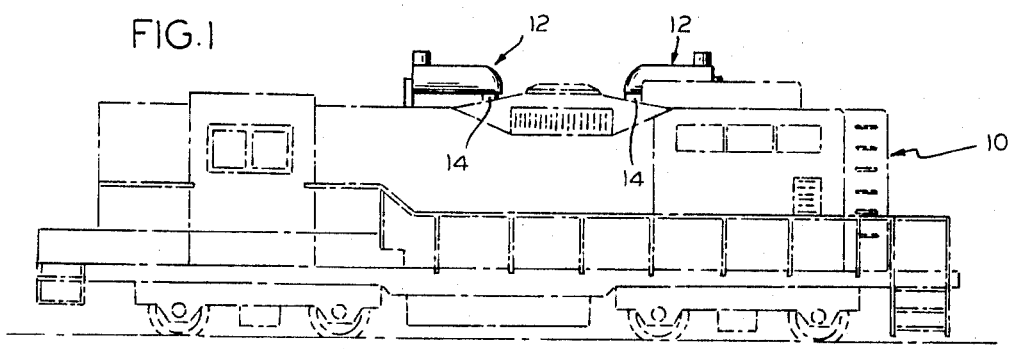
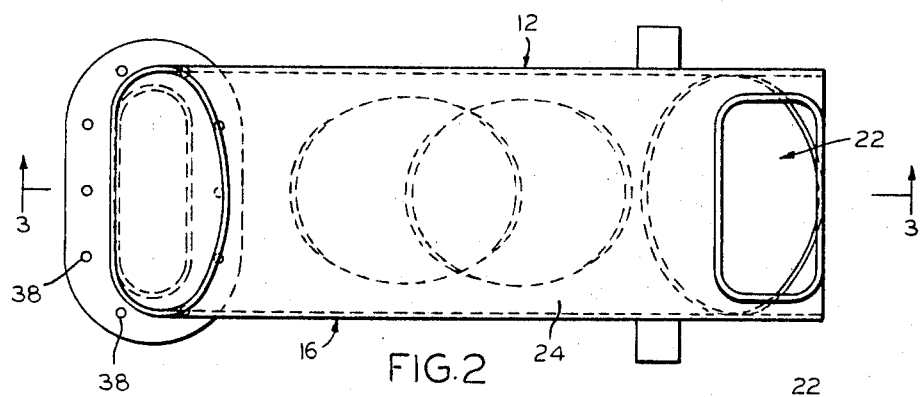
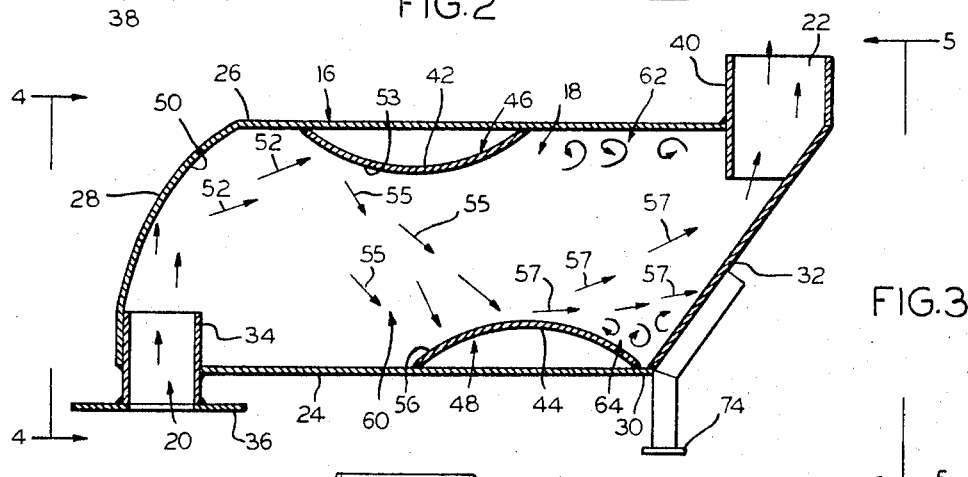
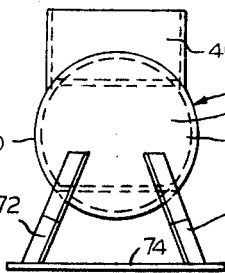
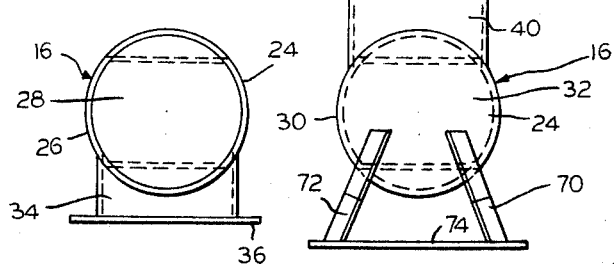
INVENTOR
MERLE L. BENZER
BY
Mann, Brown & McWilliams
ATTORNEYS United States Patent Office 3,273,326
Patented Sept. 20, 1966

3,273,326
SPARK ARRESTOR FOR DIESEL LOCOMOTIVE ENGINES
Merle L. Benzer, 559 S. Oak Park Court,
Milwaukee 14, Wis.
Filed Oct. 26, 1964, Ser. No. 406,329
6 Claims. (Cl. 55—434)

My invention is directed to spark arrestors, and more particularly, to a spark arrestor arrangement that is especially adapted for railroad diesel locomotive engines.

Diesel locomotives have come into wide use on railroads in recent years, and while they provide many advantages over the now outdated steam locomotives, the well-known sparking problem of steam locomotives has continued with diesels.

In connection with diesel locomotives, the problem lies in the fact that the locomotive exhaust gases contain chunks of carbon that ignite after they are thrown out of the exhaust stack, and if these carbon pieces are still burning when they hit the ground, there is considerable danger that a disastrous fire may be ignited.

The problem is particularly critical where the locomotive has been idling for a period of time and then starts off under load. At this point, the additional effort required to pull the load causes the locomotive to clean itself out and it throws off large chunks of carbon into its exhaust system.

In the past, spark arrestors have used two principal methods of eliminating carbon from the gases that are to be exhausted. One method involves the principal of using centrifugal force to separate out the particles in the gaseous flow, and this is done by employing baffles and the like that are to swirl the gas around so that the heavier particles will separate from the gas flow. While this method has been in wide use for many years on a wide variety of spark arrestor designs, it has not been particularly successful due to the fact that it does not insure that all the carbon particles are removed before the exhaust gases are ejected.

Another approach to the problem has been to conduct the exhaust gases through filtering discs and the like that in effect filter out the objectionable carbon particles. This requires a complexity of parts and creates a considerable back pressure within the exhaust system that is not suitable for diesel locomotive operation.

Contrary to all prior approachces, a principal object of my invention is to avoid the swirling and filtering approaches, and instead, to provide a spark arrestor arrangement that creates a controlled turbulence within the spark arrestor which effects a complete breaking up of the carbon so that when it is ejected from the spark arrestor it is in the form of very small particles that burn up almost immediately, but in any event before falling to the ground.

Another principal object of this invention is to provide a spark arrestor arrangement that includes a novel turbulence creating arrangement which insures the complete breaking up of the carbon that is in the exhaust gases that pass through the arrestor.

Other objects of the invention are to provide a spark arrestor that keeps back pressures at a minimum, to provide a spark arrestor that is free from any moving parts, and to provide a spark arrestor that is economical of manufacture, simple to install on existing or new equipment, and that is substantially maintenance free.

Other objects, uses, and advantages will be obvious or become apparent from a consideration of the following detailed description and the application drawing.

In the drawing:

FIGURE 1 is a small scale diagrammatic side elevational view showing a pair of spark arrestors arranged in accordance with my invention applied to a standard diesel locomotive engine, with the engine being shown in outline;

FIGURE 2 is a top plan view of the right hand spark arrestor of FIGURE 1;

FIGURE 3 is a cross-sectional view substantially along line 3—3 of FIGURE 2;

FIGURE 4 is an end view of the spark arrestor shown in FIGURE 2 taken along line 4—4 of FIGURE 3; and FIGURE 5 is an end view of the spark arrestor shown in FIGURE 2 taken along line 5—5 of FIGURE 3.

However, it should be understood that the specific drawing illustrations provided are supplied primarily to comply with the requirements of 35 U.S.C. 112, and that the invention may assume other embodiments.

Reference numeral 10 of FIGURE 1 generally indicates a diesel locomotive that has applied thereto a pair of spark arrestors 12 arranged in accordance with this invention, which have been connected to the locomotive exhaust stacks 14.

The details of the individual spark arrestors 12 are shown in FIGURES 2–5, wherein it will be seen that the spark arrestors 12 comprise a casing 16 defining an exhaust gas receiving chamber 18 that receives the diesel engine exhaust gas from an inlet 20 and discharges it through an outlet 22.

The casing is defined by a cylindrical body portion 24 which has one end 26 thereof closed by an arcuate end plate 28 and the other end 30 closed by inclined planar plate 32.

The inlet 20 is defined by tubular member 34, which as shown in FIGURE 2 is elongated in transverse dimension and has attached to its outer end portion a circumambient flange 36 formed with appropriate bolt holes 38 for attachment to a corresponding flange that forms a part of the end of conventional locomotive exhaust stacks.

The outlet 22 is formed by conduit member 40, which, as indicated in FIGURE 2, is generally quadrilateral and elongated in transverse cross-sectional configuration. Preferably the conduit member 40 is proportioned with relation to the conduit member 34 such that the outlet port 22 has a larger cross-sectional area than the corresponding dimension of the inlet port 20, to avoid build up of back pressures within the spark arrestor.

Mounted within the chamber 18 are a pair of spherically contoured convexly curved protuberances 42 and 44 defining bubbles or spoilers 46 and 48 within the chamber 18 that are oriented with respect to each other and with respect to the inlet and outlet ports as well as the end plates 28 and 32 to effect a special turbulence creating action on the exhaust gases that effects complete fragmenting of the troublesome carbon particles.

In accordance with this invention, the end plate 28 is positioned with respect to the inlet port 20 so that it arcs across the flow of the exhaust gases as they enter chamber 18, with the result that carbon particles in these gases impinge against the inner surface 50 of end plate 28 and bounce off in the direction of arrows 52 toward protuberance 42. Also, the protuberance 42 is positioned with respect to the end plate 28 and the protuberance 44 such that carbon particles impinge against the spherical surface 53 of protuberance 42 and then deflect in the general direction of the other side of the chamber 18 and the protuberance 44, as indicated by the arrows 55.

Carbon particles impinging against spherical surface 56 of protuberance 44 deflect in the general direction of plate 32, as indicated by arrows 57.

Since the surface 53 of protuberance 42 and the corresponding surface 56 of the protuberance 44 are convexly and spherically contoured, carbon particles impinging against them are deflected in a spreading out type of action away from the respective protuberances in which, however, the particles stay within the mainstream of the gas flow through chamber 18. The gaseous flow itself is also similarly deflected, which creates substantial turbulence within the chamber 18 even though no mechanical agitators are present.

The general gaseous flow under the pressure created by incoming gases impinges against end plate 32, and is deflected in the direction of the outlet port 22, as indicated by the arrows adjacent that port in FIGURE 3.

Chamber 18 thus defines an open flow path 60 (devoid of baffles and filters) through the casing 12 and between end plates 28 and 32. Protuberances 42 and 44 define novel turbulence creating deflecting surfaces on either side of flow path 60 that effect a complete pulverizing of carbon chunks or particles that enter into chamber 18.

An important aspect of the spark arrestor 12 lies in the fact that the protuberances 42 and 44 form gas eddys 62 and 64 at the top and bottom portion of the casing 16 at the lee sides of the respective protuberances, which has been found to materially decrease pressure build up problems. The eddys provide a substantially frictionless gaseous flow guiding medium at the top and bottom of the casing which avoids gas flow impedance due to friction with the casing top and bottom portions.

The end 30 of the casing 16 when mounted in place is preferably braced by employing suitable angle iron members 70 and 72 that are secured to bracket plate 74 which in turn may be affixed to or rest on the locomotive in any suitable and convenient manner.

As indicated in the drawings, the protuberances 42 and 44 project into the chamber 18 on the order of from about one tenth to two tenths of the internal transverse dimension of the casing, and preferably, they are proportioned to have a maximum diameter on the order of about ¾ the internal maximum dimension of the casing.

In use, it will be found that when a spark arrestor 12 is mounted in the manner indicated in FIGURE 1 on the top of an engine exhaust stack 14, in which position the casing will be horizontally disposed with the inlet and outlet ports being vertically disposed, the exhaust gases under the exhausting action of the engine will move through the casing substantially in the manner indicated by the flow arrows of FIGURE 3, with the carbon particles tending to engage and deflect from the respective deflecting surfaces following the light reflecting principle of the angle of incidence equalling the angle of reflection. Carbon particle deflection from the surfaces 53 and 56 effects a wide dispersal of the carbon particles, and the multiple collisions resulting together with the gas turbulence resulting effects a complete fragmenting of the carbon particles involved.

Experience in operating specific embodiments of this invention on EMD F-7 and GP-9 type locomotives has shown that sparking carbon will burn out before reaching the ground, even at operating speeds, and in most cases, the sparks are extinguished by the time the solid particles have fallen to a level equivalent to the top of a locomotive.

It has also been found that with the turbulence creating arrangement shown in the drawings, the exhaust gases do not tend to flow along the casing side surfaces (as distinguished from the top and bottom surfaces that carry the protuberances 42 and 44). This means that the flow guidance will be substantially by the eddys or back wash 62 and 64, which shows why there is little back pressure built up in my device. Furthermore, this tends to make the arrestor 12 self-cleaning and prevents carbon build up at any one point along the arrestor that might break loose and create the spark hazard that is not the product of engine operation.

The simplicity of arrangement and lack of moving parts in arrestor 12 make it maintenance free. These devices can be applied to a locomotive and then forgotten aside from periodically checking the connection to the engine exhaust stack.

The foregoing description and the drawings are given merely to illustrate and explain my invention and the invention is not to be limited thereto, except insofar as the appended claims are so limited, since those skilled in the art who have my disclosure before them will be able to make modifications and variations therein without departing from the scope of the invention.

I claim:
1. A spark arrestor for application to diesel engine exhaust stacks and the like comprising:
   a chamber defining an open flow path for combustion exhaust gases,
   said chamber including an inlet passage at one end of said chamber on one side thereof and an outlet passage at the other end of said chamber at the side of said chamber opposing said one side,
   with said passages being directed substantially at right angles to said flow path,
   said chamber defining a first deflecting surface in flow deflecting relation to said inlet passage and a second flow deflecting surface in flow deflecting relation to said outlet passage,
   said second surface being oriented to deflect exhaust gases passing through said flow path into and out of said outlet passage,
   said chamber defining a pair of turbulence inducing convexly curved protuberances extending into said flow path intermediate said passages,
   one of said pair of protuberances being positioned at said one side of said chamber,
   and the other of said protuberances being positioned at said opposing side of said chamber,
   said first deflecting surface being oriented to deflect exhaust gases against said other protuberance,
   and said other protuberance being positioned to deflect exhaust gases in the direction of said one protuberance.

2. A spark arrestor for application to diesel locomotive stacks and the like comprising:
   a casing having a chamber defining an open flow path for combustion exhaust gases,
   said casing defining an inlet passage at one end of said chamber on one side thereof and an outlet passage at the other end of said chamber at the side of said chamber opposing said one side,
   with said passages being directed substantially at right angles to said flow path,
   said chamber defining a first deflecting surface in flow deflecting relation to said inlet passage and a second flow deflecting surface in flow deflecting relation to said outlet passage,
   said second surface being oriented to deflect exhaust gases passing through said flow path into and out of said outlet passage,
   said casing defining a pair of turbulence inducing convexly spherically contoured protuberances extending into said flow path intermediate said passages,
   one of said pair of protuberances being positioned at one side of said chamber adjacent said second flow deflecting surface,
   and the other of said protuberances being positioned at said opposing side of said chamber between said one protuberance and said inlet passage,
   said first deflecting surface being oriented to deflect exhaust gases against said other protuberance,
   and said other protuberance being positioned to deflect exhaust gases in the direction of said one protuberance.

3. The spark arrestor set forth in claim 2 wherein:
   said protuberances extend into said chamber on the order of one to two tenths of the transverse dimension of said casing.

4. The spark arrestor set forth in claim 2 wherein:
   said outlet passage defines an outlet port and said inlet passage defines an inlet port,
   said outlet port having an effective area that exceeds that of said inlet port.

5. The spark arrestor set forth in claim 2 wherein:
said casing at said inlet port is flanged for connection to flanged end portions of locomotive stacks and the like.

6. A spark arrestor for application to diesel engine exhaust stacks and the like comprising:
a chamber defining an open flow path for combustion exhaust gases,
said chamber including an inlet passage at one end of said chamber on one side thereof and an outlet passage at the other end of said chamber,
said chamber defining a pair of turbulence inducing convexly and substantially spherically contoured protuberances extending into said flow path intermediate said passages,
one of said pair of protuberances being positioned at said one side of said chamber,
and the other of said protuberances being positioned at the opposing side of said chamber,
said chamber further defining a deflecting surface in flow deflecting relation to said inlet passage,
said deflecting surface being oriented to deflect exhaust gases against said other protuberance,
and said other protuberance being positioned to deflect exhaust gases in the direction of said one protuberance.

References Cited by the Examiner

UNITED STATES PATENTS 2,736,541 2/1956 Maiman _____ 110—119 X

FOREIGN PATENTS 414,380 8/1934 Great Britain.

KENNETH W. SPRAGUE, *Primary Examiner.*

UNITED STATES PATENT OFFICE
CERTIFICATE OF CORRECTION

Patent No. 3,273,326 September 20, 1966

Merle L. Benzer

It is hereby certified that error appears in the above numbered patent requiring correction and that the said Letters Patent should read as corrected below.

Column 4, line 56, after "positioned at" insert -- said --.

Signed and sealed this 29th day of August 1967.

(SEAL)
Attest:

ERNEST W. SWIDER
Attesting Officer

EDWARD J. BRENNER
Commissioner of Patents